(12) United States Patent
Marcovitch et al.

(10) Patent No.: US 11,762,773 B2
(45) Date of Patent: *Sep. 19, 2023

(54) MEMORY-BASED SYNCHRONIZATION OF DISTRIBUTED OPERATIONS

(71) Applicant: Mellanox Technologies, Ltd., Yokneam (IL)

(72) Inventors: Daniel Marcovitch, Yokneam Illit (IL); Gil Bloch, Zichron Yaakov (IL); Richard Graham, Knoxville, TN (US); Ariel Shahar, Jerusalem (IL); Roee Moyal, Yokneam Illit (IL); Igor Voks, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,453

(22) Filed: Jul. 13, 2022

(65) Prior Publication Data

US 2022/0398197 A1 Dec. 15, 2022

Related U.S. Application Data

(63) Continuation of application No. 16/916,153, filed on Jun. 30, 2020, now Pat. No. 11,397,682.

(51) Int. Cl.
*G06F 12/0813* (2016.01)
*G06F 12/06* (2006.01)
(Continued)

(52) U.S. Cl.
CPC ........ *G06F 12/0813* (2013.01); *G06F 9/5011* (2013.01); *G06F 9/544* (2013.01); *G06F 12/063* (2013.01); *G06F 2209/508* (2013.01)

(58) Field of Classification Search
CPC .......... G06F 9/5011; G06F 9/52; G06F 9/544; G06F 12/063; G06F 12/0813; G06F 2209/508
See application file for complete search history.

(56) References Cited

U.S. PATENT DOCUMENTS 9,971,826 B1 * 5/2018 Belmar .................. G06F 9/544
10,558,573 B1 * 2/2020 Kessler ............... G06F 12/0844
(Continued)

OTHER PUBLICATIONS

Di Girolamo et al., "Exploiting Offload Enabled Network Interfaces," Proceedings of the 23rd IEEE Annual Symposium on High-Performance Interconnects, pp. 26-33, Aug. 2015.

*Primary Examiner* — Aracelis Ruiz
(74) *Attorney, Agent, or Firm* — KLIGLER & ASSOCIATES PATENT ATTORNEYS LTD (57) ABSTRACT

A network device in a communication network includes a controller and processing circuitry. The controller is configured to manage execution of an operation whose execution depends on inputs from a group of one or more work-request initiators. The processing circuitry is configured to read one or more values, which are set by the work-request initiators in one or more memory locations that are accessible to the work-request initiators and to the network device, and to trigger execution of the operation in response to verifying that the one or more values read from the one or more memory locations indicate that the work-request initiators in the group have provided the respective inputs.

32 Claims, 8 Drawing Sheets

(51) Int. Cl.
    *G06F 9/54*      (2006.01)
    *G06F 9/50*      (2006.01)

(56)        References Cited

U.S. PATENT DOCUMENTS

| | | | |
|---|---|---|---|
| 10,572,400 | B2 | 2/2020 | Finkelstein et al. |
| 11,397,682 | B2 | 7/2022 | Marcovitch et al. |
| 2004/0143712 | A1* | 7/2004 | Armstrong .............. G06F 9/544 |
| | | | 711/147 |
| 2005/0216655 | A1 | 9/2005 | Rosenbluth |
| 2005/0216656 | A1 | 9/2005 | Rosenbluth |
| 2017/0228271 | A1 | 8/2017 | Tsirkin |

* cited by examiner

MEMORY-BASED SYNCHRONIZATION OF DISTRIBUTED OPERATIONS

CROSS-REFERENCE TO RELATED APPLICATION

This application is a continuation of U.S. patent application Ser. No. 16/916,153, filed Jun. 30, 2020, which is incorporated herein by reference.

FIELD OF THE INVENTION

The present invention relates generally to distributed computing, and particularly to methods and systems for memory-based synchronization of distributed operations.

BACKGROUND

In distributed-computing applications, compute elements, such as processes and/or threads collaborate in performing some specified distributed operation. Various techniques for offloading parts of distributed operations are known in the art. Offloading techniques are described, for example, by Di Girolamo et al., in "Exploiting Offload Enabled Network Interfaces," Proceedings of the 23$^{rd}$ IEEE Annual Symposium on High-Performance Interconnects, 2015, pages 26-33.

SUMMARY

An embodiment of the present invention that is described herein provides a network device in a communication network. The network device includes a controller and processing circuitry. The controller is configured to manage execution of an operation whose execution depends on inputs from a group of one or more work-request initiators. The processing circuitry is configured to read one or more values, which are set by the work-request initiators in one or more memory locations that are accessible to the work-request initiators and to the network device, and to trigger execution of the operation in response to verifying that the one or more values read from the one or more memory locations indicate that the work-request initiators in the group have provided the respective inputs.

In some embodiments, at least one of the one or more memory locations resides in the network device. In Addition or alternatively, at least one of the one or more memory locations may reside in a compute node that hosts the network device. Further additionally or alternatively at least one of the one or more memory locations may reside remotely from the network device, over the communication network.

In some embodiments, the processing circuitry is configured to verify that the one or more values read from the one or more memory locations indicate that all the work-request initiators in the group have consented to the execution of the operation. In an example embodiment, the one or more memory locations include multiple memory locations, each memory location set by a respective work-request initiator in the group, and the processing circuitry is configured to evaluate a condition defined over the values read from the memory locations, and to trigger the execution of the operation in response to verifying that the condition is met.

In an embodiment, the processing circuitry is configured to evaluate the condition by calculating a minimum among the values read from the memory locations, and to trigger the execution of the operation in response to verifying that the minimum reaches a target value. In another embodiment, the one or more memory locations include a single memory location that is shared among the work-request initiators in the group, and the one or more values comprise a single counter value that is updated by the work-request initiators in the shared memory location.

In some embodiments, a size of the group is predefined. In some embodiments, the controller is further configured to define a condition that depends on the one or more values stored in the one or more memory locations, and the processing circuitry is configured to evaluate the condition over the one or more values read from the one or more memory locations, and to trigger the execution of the operation in response to verifying that the condition is met.

In a disclosed embodiment, two or more of the work-request initiators reside in a single compute node. In addition or alternatively, at least two of the work-request initiators may reside in different compute nodes. Further additionally or alternatively, at least one of the work-request initiators may reside in the network device. In some embodiments, at least a given work-request initiator resides in a compute node that hosts the network device, and the controller is configured to receive from the compute node a command for setting a memory location, and to atomically access the memory location in response to the write command. In an embodiment, the command is a Memory Mapped Input-Output (MMIO) access.

There is additionally provided, in accordance with an embodiment of the present invention, a method for distributed computing in a network device in a communication network. The method includes, for an operation whose execution depends on inputs from a group of one or more work-request initiators, reading, by the network device, one or more values, which are set by the work-request initiators in one or more memory locations that are accessible to the work-request initiators and to the network device. Execution of the operation is triggered by the network device, in response to verifying that the one or more values read from the one or more memory locations indicate that the work-request initiators in the group have provided the respective inputs.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for synchronizing distributed operations. In the present context, the term "distributed operation" refers to any operation whose execution depends on inputs from a plurality of entities, e.g., software processes and/or compute nodes. The entities that provide inputs to a distributed operation are referred to herein as "work-request initiators" (WRIs). A WRI may comprise, for example, a remote compute node, a local process, a thread or other entity, and/or an update issued by a network device. The work-request initiators of a given distributed operation may reside on different compute nodes and/or share the same compute node.

In many practical scenarios, the execution of a certain distributed operation depends on inputs from a plurality of work-request initiators in a designated group. For example, a distributed operation may depend on previous results provided by the work-request initiators in the group. In the present context, the term "synchronization" refers to any mechanism that ensures that the distributed operation is executed only after the necessary inputs have been provided.

One possible solution is for a Central Processing Unit (CPU) of the compute node that performs the distributed operation to communicate with the various work-request initiators in the group. The CPU may verify that all necessary inputs have been provided, and then proceed to execute the distributed operation. As can be appreciated, this solution is highly inefficient as it consumes CPU resources, introduces dependencies among processes and incurs latency.

In embodiments of the present invention, synchronization is offloaded to a network device, e.g., to a network adapter or a switch in the communication network that connects the compute nodes hosting the work-request initiators. Any of the WRIs in the group may reside, for example, on a remote compute node, on the local compute node that hosts the network device, or on the network device itself.

In some embodiments, the work-request initiators in the group provide their inputs by modifying a value in a shared memory location that is accessible over the network. The shared memory location may reside, for example, in a memory of the network device, in a memory of the compute node performing the distributed operation, or in any other memory that is accessible to the work-request initiators and to the network device. The network device monitors the value in the shared memory location, and, when the value indicates that the work-request initiators in the group have provided their respective inputs, triggers execution of the distributed operation.

In one example embodiment, the number of work-request initiators in the group is predefined, and the value stored in the shared memory location represents a counter value. Each work-request initiator in the group updates the counter value upon providing its respective input. When the counter value indicates that all the work-request initiators in the group have provided their inputs, the network device triggers execution of the distributed operation.

In other embodiments, each work-request initiator in the group is assigned a different respective memory location. Here, too, the memory locations may reside in any suitable memory that is accessible to the work-request initiators and to the network device. Each work-request initiator updates the value in its respective memory location upon providing its input. The network device monitors the memory locations assigned to the work-request initiators, and calculates a minimum over the values stored in the memory locations. When the minimum reaches an expected target value, the network device triggers execution of the distributed operation.

Various kinds of distributed operations can be synchronized in this manner. A distributed operation may comprise, for example, a computation that depends on previous results or interim results provided by multiple work-request initiators. Another distributed operation may comprise, for example, a communication task, such as sending a packet whose content or attributes depends on inputs from multiple work-request initiators. Other examples of distributed operations include local Direct Memory Access (DMA) copy operations, memory registration, local write operations, Completion Queue Element (CQE) generation, and cross-channel operations (i.e., operations that schedules a work queue element on a given queue depending on another queue). Examples of such use-cases are given herein.

In alternative embodiments, the compute node performing the distributed operation provides the network device with a condition. The condition (i) depends on the value stored in the shared memory location, and (ii) when met, indicates that all the work-request initiators in the group have provided their inputs. In these embodiments, the condition and/or the number of work-request initiators in the group are not necessarily predefined. The network device monitors whether the value in the shared memory location renders the condition true. When the condition is met, the network device triggers execution of the distributed operation.

In alternative embodiments, the disclosed techniques are applicable not only to distributed operations, but also to operations that depend on input from a single work-request initiator. One such example is a cross-channel operation.

The disclosed techniques are highly efficient and scalable, as they essentially have two levels of offloading. Performing synchronization by a network device means that the compute node CPUs are offloaded of this task. Moreover, since the synchronization is based on direct access to a shared memory location, not only the compute node, but also the controller of the network device, is offloaded.

Memory-Based Synchronization—Static Match Condition

Figure 1:
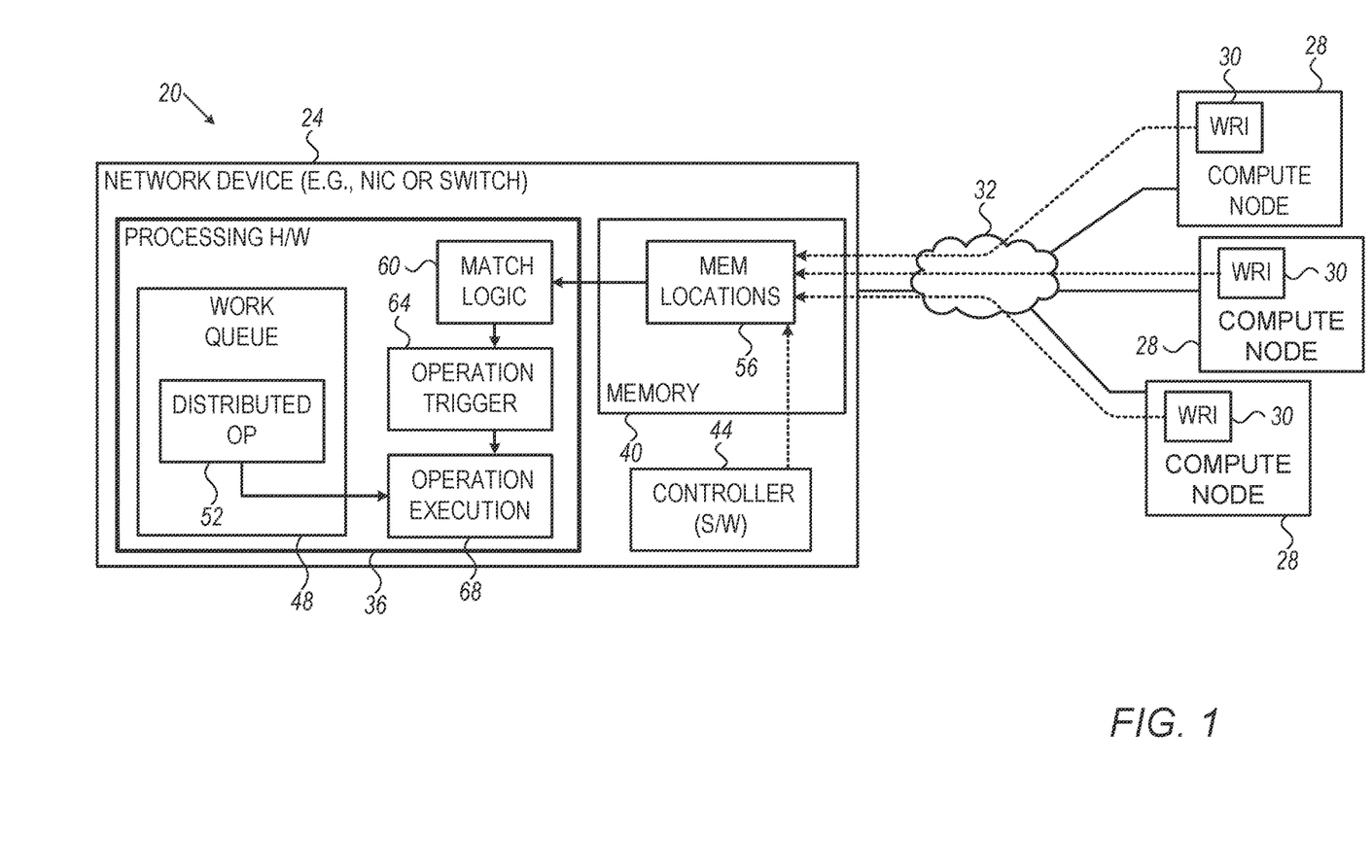
FIG. 1 is a block diagram that schematically illustrates a distributed-computing system that uses memory-based synchronization of distributed operations, in accordance with an embodiment of the present invention.

FIG. 1 is a block diagram that schematically illustrates a distributed-computing system 20, in accordance with an embodiment of the present invention. System 20 comprises a network device 24 that, among other functions, synchronizes distributed operations performed by work-request initiators (WRIs) 30 hosted by one or more compute nodes 28. Network device 24 and compute nodes 28 communicate over a communication network 32. The figure illustrates three compute nodes 28 for the sake of clarity. Real-life systems may comprise a considerably larger number of compute nodes.

Compute nodes 28 may comprise, for example, servers, workstations or any other suitable type of computers. Network 32 may comprise any suitable type of network, e.g., an Ethernet or Infiniband network. Compute nodes 28 may be collocated, e.g., with network 32 being a Local-Area Network (LAN), or geographically dispersed, e.g., with network 32 being a Wide-Area Network (WAN) such as the Internet.

In some embodiments, network device 24 comprises a network adapter, e.g., an Ethernet Network Interface Controller (NIC) or an Infiniband Host Channel Adapter (HCA). In these embodiments, the network adapter may be the same network adapter that connects one of compute nodes 28 to network 32, or a network adapter separate from the compute nodes. In other embodiments, network device 24 comprises a network switch in network 32, or any other suitable type of network element.

In the present example, a certain compute node 28 is assigned to perform a distributed operation, also referred to as "operation" for brevity. The operation depends on inputs provided by a group of two or more work-request initiators 30, running on one or more of compute nodes 28. In other words, the inputs from the work-request initiators in the group are prerequisite for the operation, and thus the operation is to be performed only once all the specified inputs have been provided. The compute node performing the operation may or may not belong to the group of compute nodes that host the work-request initiators.

The distributed operation may comprise, for example, a reduction operation, a barrier operation or a memory registration operation. Such use-cases are demonstrated in FIGS. 6-8 below. Alternatively, however, the disclosed techniques can be used for carrying out any other suitable distributed operation.

In the disclosed embodiment, network device 24 is configured to synchronize between the work-request initiators involved in performing the operation, i.e., to ensure that all the specified inputs have been provided before the operation is performed.

In the example of FIG. 1, network device 24 comprises processing hardware (H/W) 36, a memory 40, and a controller 44 that runs suitable software (S/W). Processing hardware 36 is also referred to as the "processing circuitry" of the network device.

Typically, controller 44 holds a definition of the operation to be performed. For example, when network device 24 comprises a network adapter of a certain compute node 28, controller 44 may receive the definition of the operation from the CPU of this compute node. As another example, when network device 24 comprises a switch in network 32, controller 44 may receive the definition of the operation from one of compute nodes 28, e.g., as an application-layer message in a packet.

Processing hardware 36 of network device 24 comprises a work queue 48. In a typical flow of operations, controller 44 posts various Work-Queue Elements (WQEs) on work queue 48. The WQEs specify operations (distributed operations or otherwise) to be performed by hardware 36.

Among the various WQEs, controller 44 posts a WQE 52 that specifies the distributed operation that network device 24 is required to synchronize. The operation in question may be local or remote. The term "remote" in this context means that the operation involves sending or receiving of a packet, or otherwise communicating over network 32. The term "local" in this context means that the operation does not involve network communication, i.e., the operation is confined to the compute node performing it. Examples of local and remote operations are given further below.

In some embodiments, network device 24 synchronizes among work-request initiators 30 in the group via a one or more memory locations 56 in memory 40. Memory locations 56 are typically accessible to the work-request initiators in the group directly, without involving controller 44 of network device 24. Typically, memory locations 56 have addresses that are known to the work-request initiators in the group, and each work-request initiator is able to modify the values stored in the memory locations by writing to these addresses. The addresses exposed to the work-request initiators may be physical addresses or logical addresses. In the latter case address translation may be performed. Memory locations 56 may have any suitable size.

As will be explained in detail below, in some embodiments all the work-request initiators in the group modify the value of a single shared memory location 56. In other embodiments, each work-request initiator is assigned a respective different memory location 56, and modifies only its assigned memory location.

In the example of FIG. 1, memory locations 56 reside in memory 40 of network device 24. Alternatively, however, any of memory locations 56 may reside in any other suitable memory that is accessible to network device 24 and to the work-request initiators in the group. Any of memory locations 56 may reside, for example, in a memory of one of compute nodes 28, e.g., the compute node that hosts network device 24.

In the context of the present patent application and in the claims, the term "memory locations" also refers to memory-mapped locations, e.g., internal registers that are mapped to memory locations. For example, in some embodiments internal registers in network device 24 are mapped to memory addresses in the memory space of the hosting compute node's CPU. This mechanism is referred to as Memory Mapped Input-Output (MMIO). The internal registers of the network device can be accessed by reading from or writing to the corresponding memory addresses. Such registers are also regarded herein as "memory locations", and accessing such registers is also regarded herein as reading/writing values from/to memory locations.

In some embodiments, a single shared memory location 56 is assigned to all work-request initiators 30 in the group. Each work-request initiator 30 in the group provides its respective input for the distributed operation. Upon providing the input, each work-request initiator modifies the value stored in shared memory location 56. The modification serves as an indication that the work-request initiator has provided its input, and gave its consent to perform the operation. The act of modifying the value stored in the shared memory location is also referred to as "posting a doorbell."

When the local compute node (the compute node that hosts network device 24) is one of the compute nodes that host the work-request initiators in the group, the value in memory location 56 is typically modified by controller 44. Remote compute nodes 28 modify the value in shared memory location 56 over network 32, e.g., using Remote Direct Memory Access (RDMA) operations.

The work-request initiators in the group may provide their respective inputs for the operation in a similar manner, e.g., over the network using RDMA for remote nodes, and using CPU store commands for a local node. Note, however, that the inputs may be provided to one location (e.g., to a memory of the compute node performing the operation), whereas shared memory location 56 may reside in an entirely different location.

Processing hardware 36 of network device 24 monitors the value stored in shared memory location 56. When the value indicates that all the work-request initiators in the group have provided their inputs, hardware 36 triggers execution of the operation (in the present example serves WQE 52 on work queue 48).

In an embodiment, processing hardware 36 comprises match logic 60, an operation trigger circuit 64 and an operation execution circuit 68. Match logic 60 monitors the value in shared memory location 56 and outputs a suitable indication when the value warrants execution of the operation. Any monitoring mechanism may be used for this purpose. In one example, match logic 60 polls the value of shared memory location 56, e.g., periodically at regular intervals. In another example, hardware logic or any suitable notification signal may trigger match logic 60 when the value in shared memory location 56 reaches the value that warrants execution of the operation. In the present context, any such mechanism is regarded herein as reading the value stored in shared memory location 56.

Operation trigger circuit 64 triggers execution of the operation upon receiving the indication from match logic 60. Operation execution circuit 68 serves WQE 52 when triggered by trigger circuit 64. When the operation is local, circuit 68 typically executes the operation. When the operation is remote, circuit 68 typically composes and sends a packet that instructs the appropriate compute node to execute the operation.

In various embodiments, the work-request initiators and network device 24 may use any suitable convention for modifying the value in shared memory location 56, and for concluding from the value whether all the work-request initiators in the group have provided their inputs. In one embodiment, the value in the shared memory location represents a counter value. Controller 44 typically resets the value when initializing the operation. Each work-request initiator in the group increments the value upon providing its input. Match logic 60 monitors the value and compares it to the number of work-request initiators in the group. When the value in shared memory location 56 reaches the number of work-request initiators in the group, match logic 60 concludes that all specified inputs are available, and triggers execution of the operation.

In an equivalent convention, controller 44 may initialize the value in shared memory location 56 to be the number of work-request initiators in the group. In this embodiment, each work-request initiator in the group decrements the value upon providing its input, and match logic 60 triggers the operation when the value reaches zero. Further alternatively, any other suitable modification and decision scheme can be used.

In alternative embodiments, the work-request initiators may update the counter value by any other suitable amount. The counter value that triggers execution of the distributed operation may comprise any other suitable (e.g., pre-negotiated) value. In one such example, each work-request initiator increments the counter value by the size (e.g., number of bytes) of the input it has provided. The network device in this example triggers execution of the operation when the counter value reaches a predetermined number of bytes.

As noted above, one or more of work-request initiators 30 may be local, i.e., run locally on the compute node that hosts network device 24. In such embodiments, controller 44 may support an atomic counter-updating command (e.g., atomic increment) for updating the memory locations 56 of local work-request initiators. Controller 44 typically receives from the hosting compute node (e.g., from a CPU of the compute node) a command that requests updating a certain memory location 56 (e.g., requests incrementing a counter value in that memory location). In one embodiment, the command comprises a MMIO access.

From the perspective of the CPU the command is typically referred to as a "store" command, whereas from the perspective of controller 44 the command can also be referred to as a "write" command. On some platforms PCIe atomic commands can be used for this purpose. In response to the command, controller 44 updates the value of the specified memory location 56 (e.g., increments the counter value) atomically. In the present context, the term "atomically" means that controller 44 does not execute any intervening commands in the same memory location during the update process.

In alternative embodiments, each work-request initiator 30 in the group is assigned a different respective memory location 56. As in the previous example, any of memory locations 56 may reside in any suitable memory that is accessible to the work-request initiators and to the network device. Each work-request initiator updates the value stored in its respective memory location upon providing the input to the operation. Match logic 60 of network device 24 monitors the memory locations assigned to the work-request initiators, e.g., by polling or otherwise, and calculates a minimum over the values stored in the memory locations. When the minimum reaches an expected target value, match logic 60 instructs operation trigger circuit 64 to trigger execution of the distributed operation.

In one example embodiment of this sort, memory locations 56 are initialized to "0". Each work-request initiator 30 increments the value in its respective memory location 56 to "1" upon providing its input to the distributed operation. When match logic 60 finds that the minimum value (computed over the values stored in memory locations 56) is "1", execution of the distributed operation is triggered.

It is noted that the disclosed technique is not limited to calculation of a minimum value. In alternative embodiment, match logic 60 may evaluate any other suitable function or condition based on the multiple values set by the multiple work-request initiators in memory locations 56.

From a hardware implementation standpoint, in some embodiments, the above process can be performed as follows:

Each WRI 30 issues a work request specifying the requested producer index (the value to be updated in the respective memory location, e.g., "0" or "1" in the example above). The manner in which the producer index is incremented is device specific.

In some embodiments, updating a memory location 56 involves both (i) issuing a "doorbell" (a MMIO write with fields that identify the queue and producer index) and (ii) updating a "doorbell record" (a write to a separate memory location, which may reside in the hosting compute node or in the network device). Issuing the producer index increment as a write into the network device allows the network device to issue new work based on an event (inbound write), rather than continuously polling on the shared memory location.

In other embodiments, only the "doorbell" (MMIO write) or "doorbell record" may be performed.

In the above examples, the match condition is "static," in the sense that the number of work-request initiators in the group (the group size) is predefined upon creation of work queue 48. As such, the value in shared memory location 56 that warrants execution of the operation is also predefined. In alternative embodiments, the match condition is "dynamic" in the sense that the group size is not necessarily predefined. Embodiments of this sort will be described below with reference to FIGS. 4 and 5.

Figure 2:
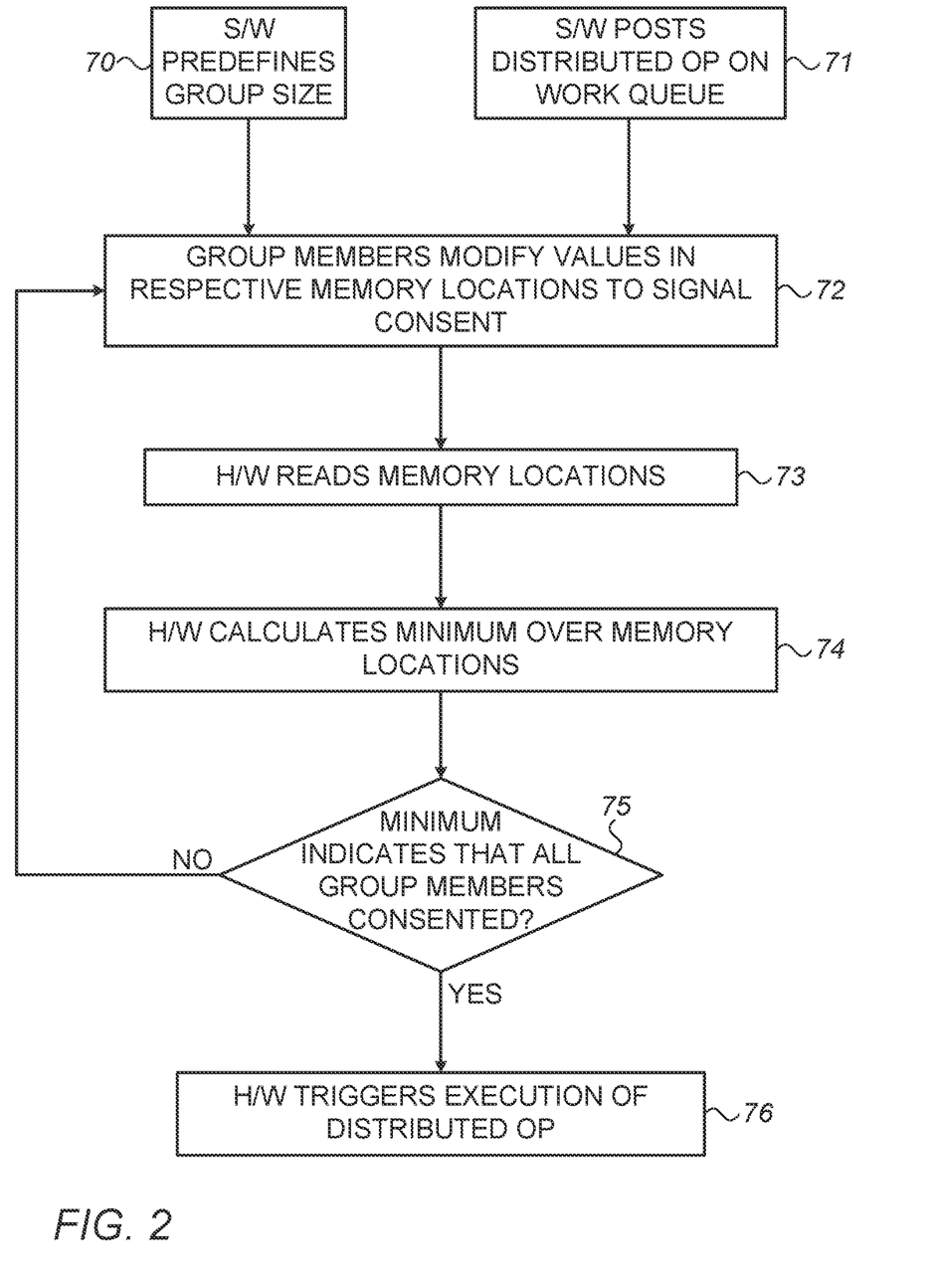
FIGS. 2 and 3 are flow charts that schematically illustrate methods for memory-based synchronization of distributed operations, in accordance with embodiments of the present invention.

FIG. 2 is a flow chart that schematically illustrates a method for memory-based synchronization of a distributed operation in system 20 of FIG. 1, in accordance with an embodiment of the present invention. The present example uses multiple shared memory locations 56, each assigned to a respective work-request initiator 30.

The method begins with the software in controller 44 of network device 24 predefining the group size, i.e., the number of work-request initiators whose inputs are needed for the operation, at a group-size definition step 70. The work-request initiators in the group are also referred to as "group members."

At an operation posting step 71, the software of controller 44 posts a WQE representing the distributed operation (e.g., WQE 52) on work queue 48. The order of steps 70 and 71 may be reversed, or they can be performed in parallel.

At an input & signaling step 72, one or more of the group members provide their inputs for the operation, and modify the value stored in their respective memory locations 56 to indicate their consent to executing the operation. Different group members typically modify the values of their respective assigned memory locations asynchronously and independently of one another.

At a monitoring step 73, match logic 60 in processing hardware 36 of network device 24 reads the values stored in memory locations 56. At a minimum evaluation step 74, match logic 60 calculates the minimum value among the values stored in memory locations 56.

At a checking step 75, match logic 60 checks whether the minimum value has reached the expected target value that indicates that all the group members have provided their inputs and thus consented to executing the operation. If not, the method loops back to step 72 above. If all the group members have provided their inputs, operation trigger circuit 64 triggers execution of the operation, at a triggering step 76.

Figure 3:
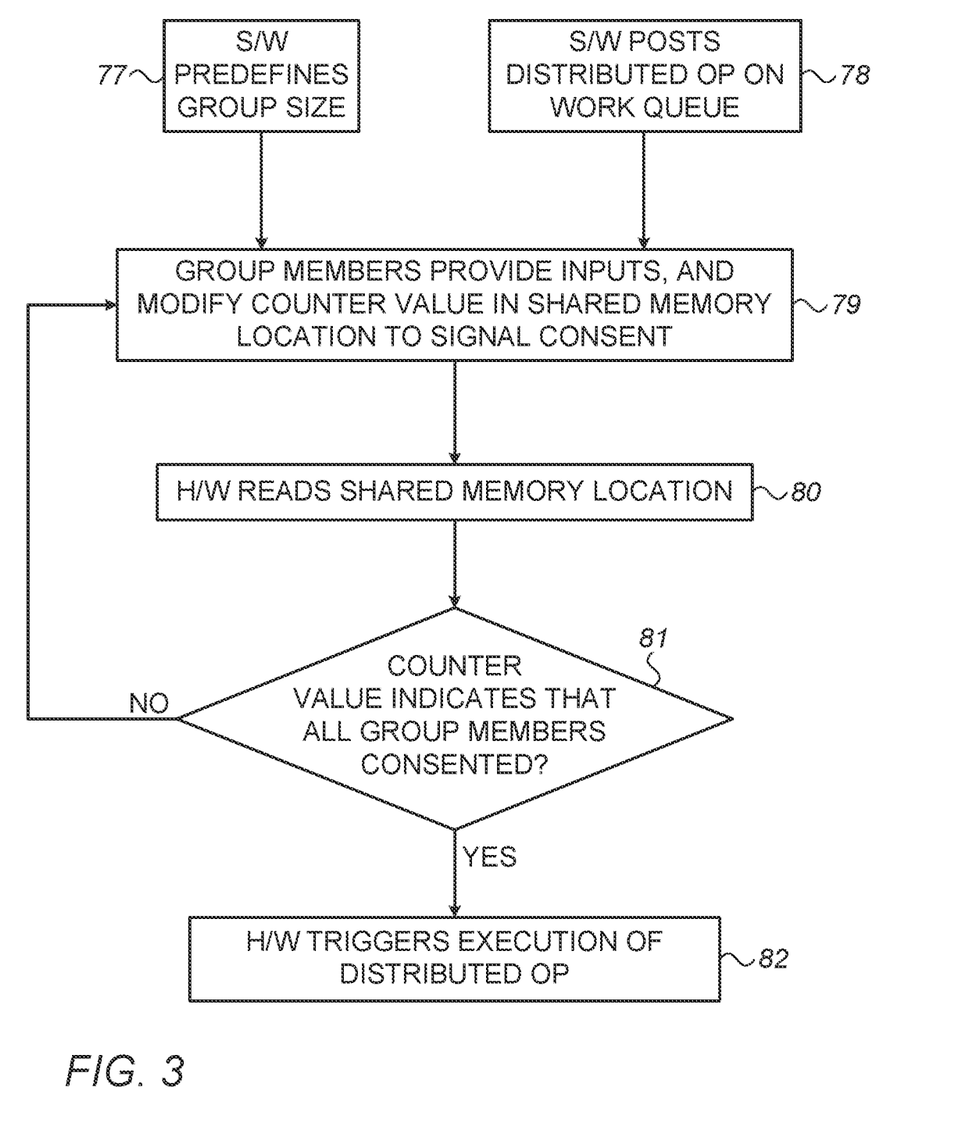

FIG. 3 is a flow chart that schematically illustrates a method for memory-based synchronization of a distributed operation in system 20 of FIG. 1, in accordance with another embodiment of the present invention. The example of FIG. 3 uses a single shared memory location 56, which serves as a counter.

The method begins with the software in controller 44 of network device 24 predefining the group size, i.e., the number of work-request initiators whose inputs are needed for the operation, at a group-size definition step 77. At an operation posting step 78, the software of controller 44 posts a WQE representing the distributed operation (e.g., WQE 52) on work queue 48. The order of steps 77 and 78 may be reversed, or they can be performed in parallel.

At an input & signaling step 79, one or more of the group members provide their inputs for the operation, and modify the counter value stored in shared memory location 56 to indicate their consent to executing the operation. Different group members typically modify the counter value asynchronously and independently of one another.

At a monitoring step 80, match logic 60 in processing hardware 36 of network device 24 reads the value stored in shared memory location 56. At a checking step 81, match logic 60 checks whether the counter value indicates that all the group members have provided their inputs and thus consented to executing the operation. If not, the method loops back to step 79 above. If all the group members have provided their inputs, operation trigger circuit 64 triggers execution of the operation, at a triggering step 82.

Memory-Based Synchronization—Dynamic Match Condition

Figure 4:
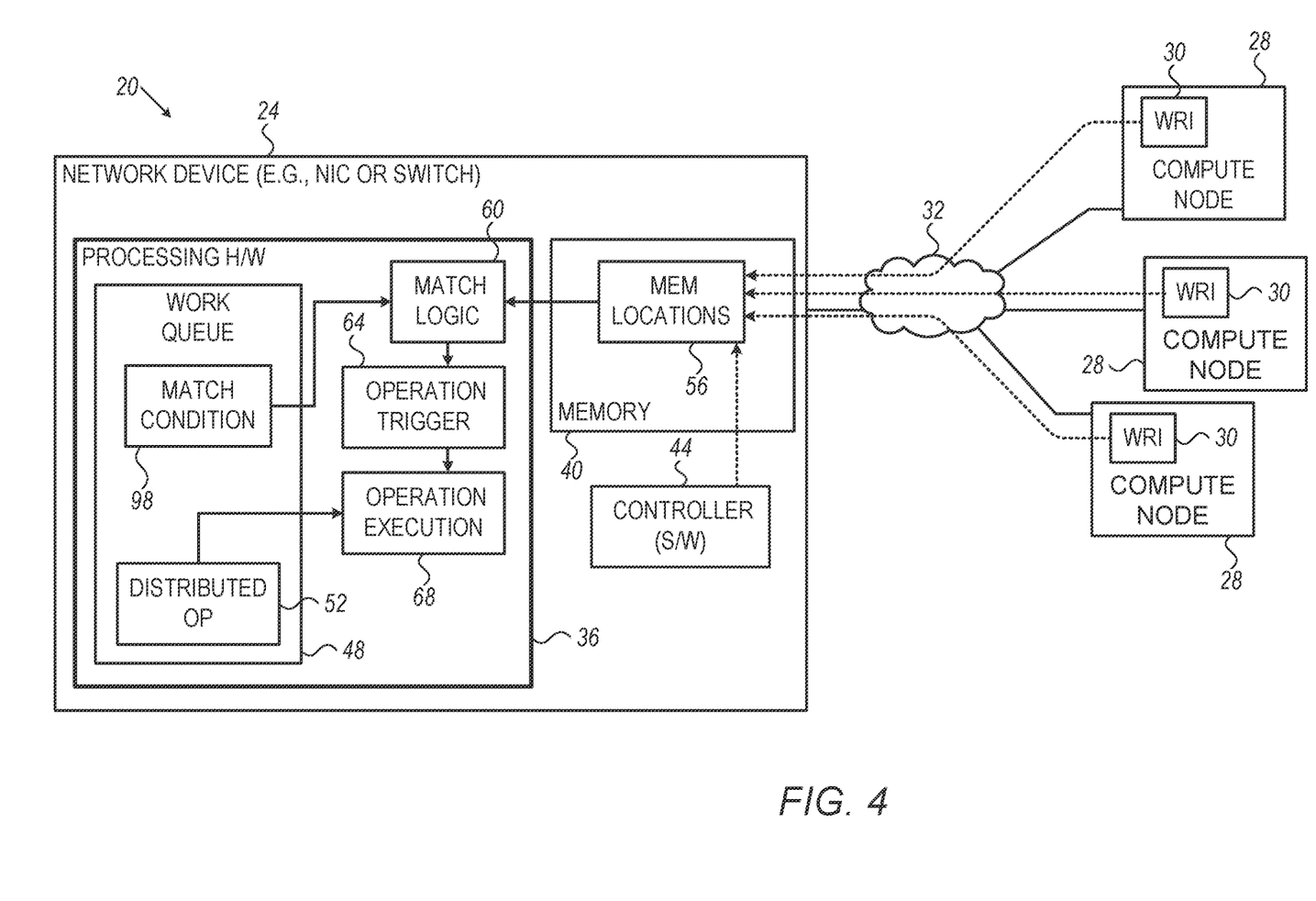
FIG. 4 is a block diagram that schematically illustrates a distributed-computing system that uses memory-based synchronization of distributed operations, in accordance with an alternative embodiment of the present invention.

FIG. 4 is a block diagram that schematically illustrates a distributed-computing system 94, in accordance with an alternative embodiment of the present invention. System 94 differs from system 20 of FIG. 1 in several respects. First of all, in system 94 the number of work-request initiators (WRIs) 30 in the group is not necessarily predefined upon creation of work queue 48.

Moreover, in addition to posting WQE 52 that specifies the distributed operation, controller 44 posts on work queue 48 a match condition 98. Match condition 98 typically depends on the (one or more) values of (one or more) memory locations 56, and is used by match logic 60 to verify whether all the work-request initiators in the group have provided their inputs.

This configuration enables the use of arbitrary match conditions, possibly complex conditions that are far more sophisticated than a counter. Match conditions may use various comparison operators (e.g., ==, !=, >, >=, <, <= and the like) over any suitable data widths. A suitable mask can be applied to data before the operation (i.e., (polled_data & mask)==expected data). Any data types can be used for the operands in the match condition (e.g., signed integer, unsigned integer, floating point. Any data width can be used, e.g., 8, 16, 32, 64 or 128 bits. Additionally or alternatively, multiple operands and/or multiple match conditions can be used, in which case an inter-condition operator may comprise, for example, OR, AND or XOR (e.g., "cond0 OR cond1", "cond0 AND cond1", or "cond0 XOR cond1"). The match condition can be posted and/or modified at any time, both locally and remotely.

Various operations can be performed using such match conditions. In one example, a work-request initiator 30 contributes data to a buffer. Each time the buffer is incremented by X bytes, the work-request initiator increments a shared counter (a shared memory location 56) by X. Match logic 60 in this example applies a series of conditions: Every time Y bytes of data is aggregated, a network operation is triggered. In this case the comparison operator in the match condition will be >=.

Another possible example involves multiple work-request initiators 30 that contribute data. Memory locations 56 in this example comprise a bitmap, having a respective bit assigned to each work-request initiator. Send can be performed as long as data has been received by at least one of the work-request initiators. Upon providing a portion of data, a work-request initiator SETs the respective bit in the bitmap. In this example, instead of a counter, the operation will be WRITE and the comparison operator in the match condition would be ==.

The two examples above are in no way limiting, and are depicted purely for the sake of conceptual clarity. In alternative embodiments, any other suitable match conditions can be used in any other suitable way, to synchronize any other suitable type of operation.

Figure 5:
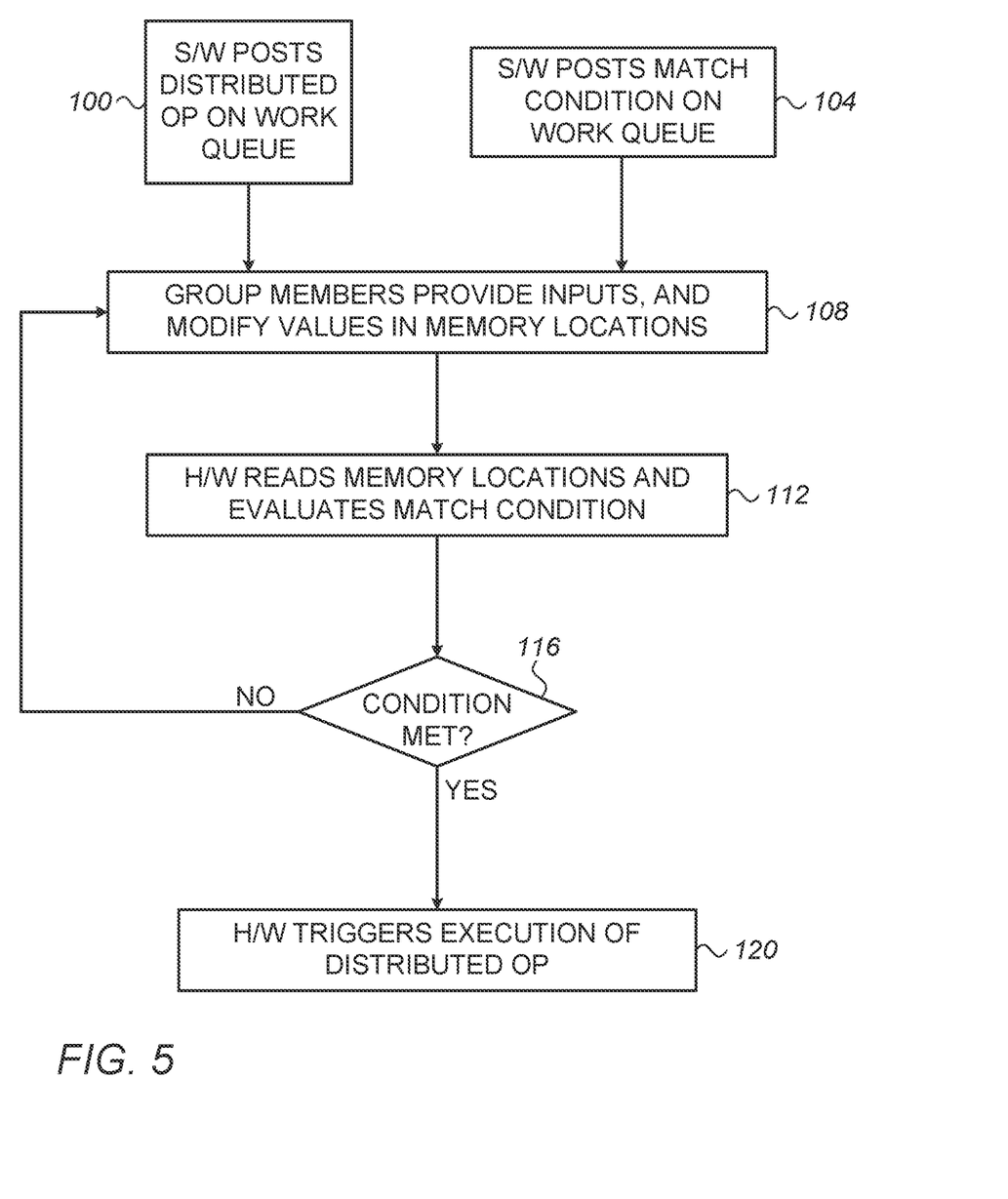
FIG. 5 is a flow chart that schematically illustrates a method for memory-based synchronization of a distributed operation, in accordance with an alternative embodiment of the present invention.

FIG. 5 is a flow chart that schematically illustrates a method for memory-based synchronization of a distributed operation in system 94 of FIG. 4, in accordance with an embodiment of the present invention. The method begins with the software in controller 44 of network device 24 posting a WQE representing the operation (e.g., WQE 52) on work queue 48, at an operation posting step 100. At a condition posting step 104, the software of controller 44 posts a match condition (e.g., match condition 98) on work queue 48. The order of steps 100 and 104 may be reversed, or they can be performed in parallel.

At an input & signaling step 108, one or more of the group members provide their inputs for the operation, and modify the (one or more) values stored in (one or more) memory locations 56. The group members typically modify the values asynchronously and independently of one another. The group members may modify the values before or after the match condition has been posted.

At a monitoring & evaluation step 112, match logic 60 in processing hardware 36 of network device 24 reads the (one or more) values stored in (one or more) memory locations 56, and evaluates the match condition over the values.

At a checking step 116, match logic 60 checks whether the match condition (evaluated over the value or values currently stored in memory locations 56) is met (meaning that all group members have provided their inputs). If the match condition is not met, the method loops back to step 108 above. If met, operation trigger circuit 64 triggers execution of the operation, at a triggering step 120.

The configurations of systems 20 and 94 shown in FIGS. 1 and 4, and their components, e.g., the configuration of network device 24 and its components, are example configurations that are depicted purely for the sake of conceptual clarity. Any other suitable configurations can be used in alternative embodiments. Elements that are not mandatory for understanding of the disclosed techniques, e.g., elements of network device 24 that are unrelated to synchronization of distributed network operations, have been omitted from the figures for the sake of clarity.

In various embodiments, the various elements of network device 24 may be implemented using suitable hardware or firmware, such as one or more Application-Specific Integrated Circuits (ASIC) or Field-Programmable Gate Arrays (FPGA), using software, or using a combination of hardware and software elements.

In some embodiments, certain elements of network device 24, e.g., controller 44, may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Example Uses—Cases

The description that follows illustrates several example use-cases for distributed operations that can be synchronized using the disclosed memory-based synchronization techniques. The use-cases below are provided as non-limiting examples. In alternative embodiments, the disclosed techniques can be used for synchronizing any other suitable distributed operation in any other suitable manner.

Figure 6:
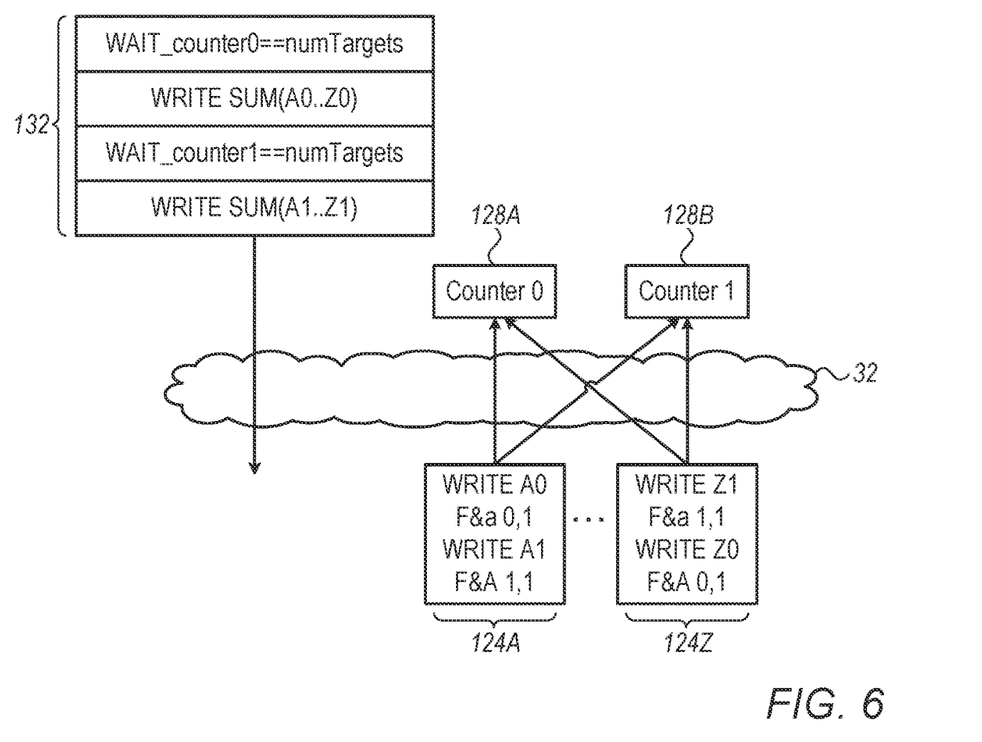
FIG. 6 is a diagram that schematically illustrates memory-based synchronization of a reduction operation, in accordance with an embodiment of the present invention.

FIG. 6 is a diagram that schematically illustrates memory-based synchronization of a reduction operation, in accordance with an embodiment of the present invention. In the present example, multiple work-request initiators 124A-124Z provide inputs to two separate distributed summation operations, using RDMA WRITE commands. The inputs to the first summation operation are denoted A0-Z0. The inputs to the second summation operation are denoted A1-Z1. The total number of work-request initiators is denoted numTargets. A counter 128A, denoted counter0, is used for counting the number of work-request initiators that provided their inputs to the first summation operation. A counter 128B, denoted counter1, is used for counting the number of work-request initiators that provided their inputs to the second summation operation. The two counters may reside, for example, in memory locations 56 of FIG. 1 or FIG. 4.

The sequence of operations performed by each work-request initiator is listed (top to bottom) in its respective block in the figure. Work-request initiator 124A begins by sending its input to the first summation operation ("WRITE A0"), and then increments counter0 using an atomic "Fetch and Add" (F&A) command ("F&A 0,1"). Work-request initiator 124A then sends its input to the second summation operation ("WRITE A1"), and then increments counter1 using another atomic F&A command ("F&A 1,1").

In the present example, work-request initiator 124Z provides its inputs in the opposite order, i.e., initially to the second summation operation and then to the first summation operation. Work-request initiator 124Z begins by sending its input to the second summation operation ("WRITE Z1"), and then increments counter1 using atomic F&A ("F&A 1,1"). Work-request initiator 124Z then sends its input to the first summation operation ("WRITE Z0"), and then increments counter1 using atomic F&A ("F&A 0,1").

A work queue 132 is used for synchronizing the two summation operations based on counters 128A and 128B, using the disclosed techniques. Queue 132 may be implemented, for example, similarly to queue 48 and be served by processing hardware 36 of network device 24 (see FIG. 1 or FIG. 4). The WQEs used for synchronization are listed top-to-bottom.

In accordance with the posted WQEs, processing hardware 36 waits until the value of counter0 (128A) is equal to numTargets, and then sends the reduction result of the first summation operation ("SUM(A0 . . . Z0)") to the appropriate recipients. Similarly, for the second summation operation, processing hardware 36 waits until the value of counter1 (128B) is equal to numTargets, and then sends the reduction result of the second summation operation ("SUM (A1 . . . Z1)") to the appropriate recipients.

Figure 7:
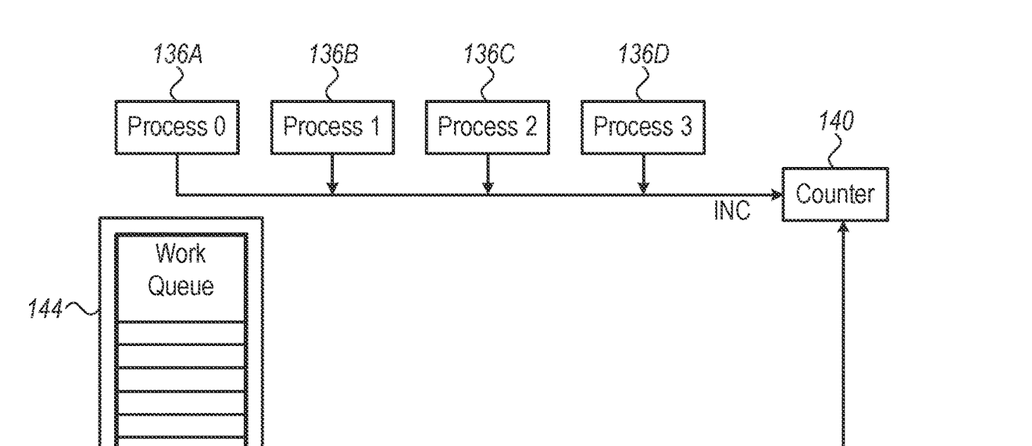
FIG. 7 is a diagram that schematically illustrates memory-based synchronization of a barrier operation, in accordance with an embodiment of the present invention.

FIG. 7 is a diagram that schematically illustrates memory-based synchronization of a distributed barrier operation, in accordance with an embodiment of the present invention. In this embodiment, multiple work-request initiators 136A-136D (in the present example comprising processes denoted Process0-Process3) provide data that are to be encapsulated in a single packet and sent.

A counter 140 is used for counting the number of work-request initiators that provided their respective inputs (data for the packet). Counter 140 may reside, for example, in a shared memory location 56 of FIG. 1 or FIG. 4. Each of the work-request initiators increments counter 140 upon providing its respective input.

A work queue 144 is used for synchronizing the distributed barrier operation based on counter 140. In other words, the WQEs posted on queue 144 ensure that the packet is not sent until all N work-request initiators (N=4 in this example) have provided their data for the packet. Queue 144 may be implemented, for example, similarly to queue 48 and be served by processing hardware 36 of network device 24 (see FIG. 1 or FIG. 4).

The WQEs used for synchronization are listed bottom-to-top. Two WQEs are posted—a WAIT WQE 148, and a WRITE WQE 152. In accordance with the WAIT WQE, processing hardware 36 first waits until the value of counter 140 exceeds N. Only then, in accordance with the SEND WQE, processing hardware 36 sends the packet.

If any of the work-request initiators resides locally on the same compute node as counter 140, incrementing the counter may be performed using an "atomic increment" command, as explained above.

Figure 8:
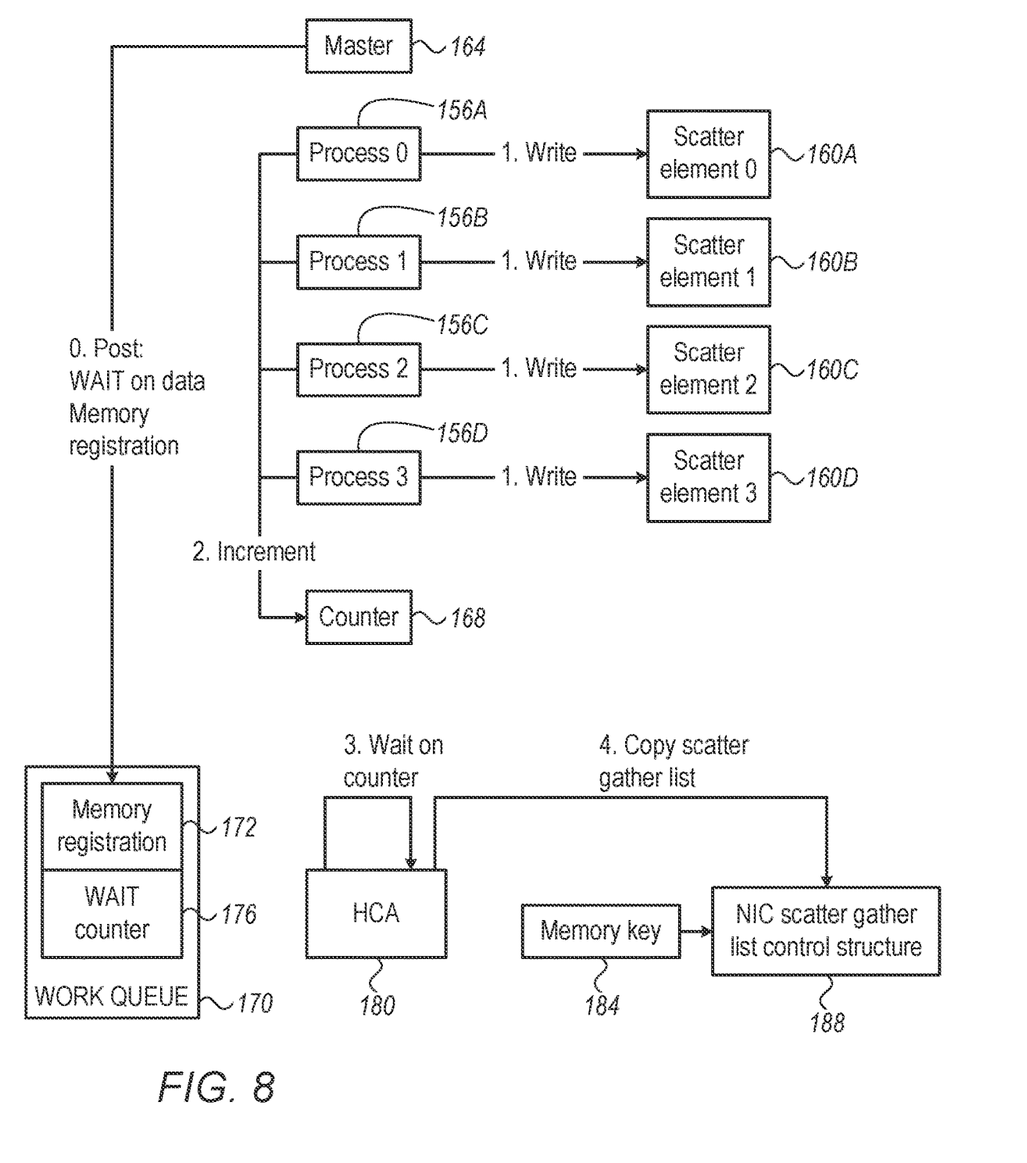
FIG. 8 is a diagram that schematically illustrates memory-based synchronization of a memory registration operation, in accordance with an embodiment of the present invention.

FIG. 8 is a diagram that schematically illustrates memory-based synchronization of a memory registration operation, in accordance with an embodiment of the present invention. In RDMA, memory registration is a process that allows a user to provide a scatter-gather list. This list is pointed to by a memory key that is later used as part of RDMA transactions.

In the example of FIG. 8, multiple processes 156A-156D (acting as work-request initiators) contribute respective scatter elements 160A-160D that together form a scatter-gather list. The scatter-gather list is subsequently used in an Infiniband HCA 180.

A counter 168 is used for counting the number of work-request initiators that provided their respective inputs (scatter elements). Counter 168 may reside, for example, in a shared memory location 56 of FIG. 1 or FIG. 4. A master process 164 initially posts two WQEs on a work queue 170—A WAIT WQE 176 and a Memory-registration WQE 172. Work queue 170 may be implemented, for example, similarly to queue 48 and be served by processing hardware 36 of network device 24 (see FIG. 1 or FIG. 4).

In accordance with WAIT WQE 176, processing hardware 36 first waits until the value of counter 168 reaches the number of work-request initiators (or equivalently, the number of scatter elements to be included in the scatter-gather list).

Each of processes 156A-156D (each work-request initiator) writes its respective scatter element, and then increments counter 168. After all scatter elements have been written, the value of counter 168 becomes equal to the number of work-request initiators, i.e., the match condition of WAIT WQE 176 is met. Execution then proceeds to WQE 172. In accordance with WQE 172, processing hardware 36 copies the complete scatter-gather list to a suitable data structure 188 in the memory of HCA 180. The scatter-gather list is pointed to by a memory key 184.

The use-cases of FIGS. 6-8 above illustrated several examples of memory-based synchronization of distributed operations. The disclosed techniques, however, are not limited to synchronization of distributed operations. For example, the methods and systems described herein can also be used for memory-based coordination ("orchestration") of queues or Queue Pairs (QPs) in network devices.

Figure 9:
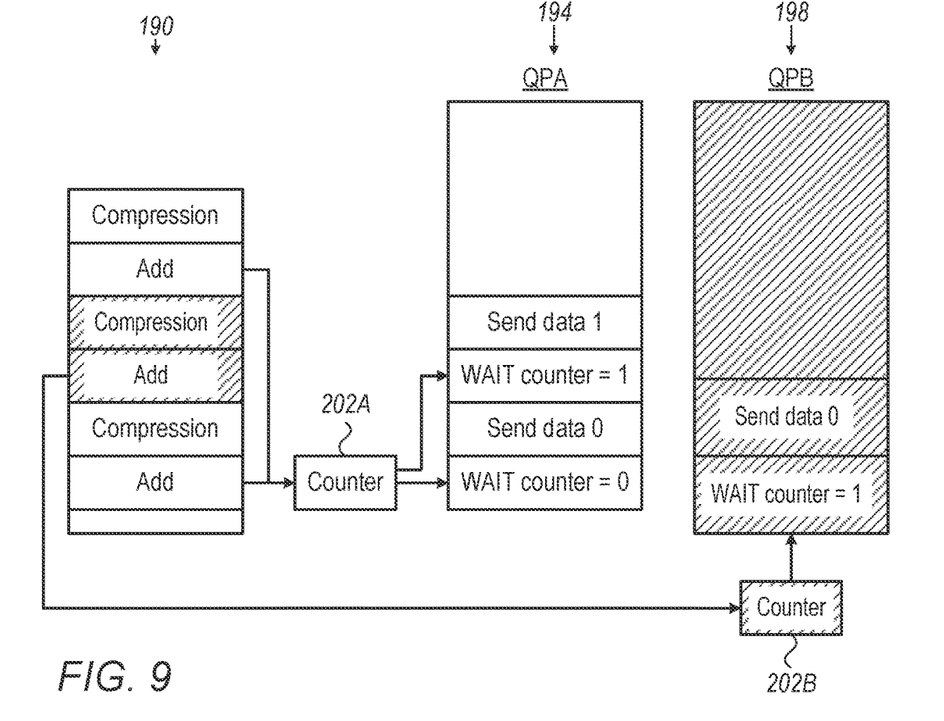
FIGS. 9 and 10 are diagrams that schematically illustrate memory-based orchestration of queues, in accordance with embodiments of the present invention.

FIG. 9 is a diagram that schematically illustrates memory-based orchestration of queues, in accordance with an embodiment of the present invention. In the present example, a NIC compresses data and then sends the compressed data over a network. The NIC applies these operations to two separate data streams. Blocks in the figure that correspond to the first data stream are drawn with a clear pattern, and blocks that correspond to the second data stream are drawn with a hashed pattern. In the embodiment of FIG. 9, the NIC performs compression and sending using three QPs. A QP 190 manages compression operations for both streams. A QP 194 (QPA) manages sending operations for the first data stream. A QP 198 (QPB) manages sending operations for the second data stream.

A counter 202A is used for ensuring that QPA will only send data of the first data stream that is ready after compression. Similarly, a counter 202B is used for ensuring that QPB will only send data of the second data stream that is ready after compression. Counters 202A and 202B may reside, for example, in memory locations 56 of FIG. 1 or FIG. 4.

In a typical process, QP 190 increments counter 202A upon completing compression of a data chunk belonging to the first data stream, and increments counter 202B upon completing compression of a data chunk belonging to the second data stream. On QPA and on QPB, each SEND WQE is preceded by a WAIT WQE. The WAIT WQE waits on the corresponding counter value, so as to ensure that the data chunk will only be sent after its compression is completed.

Figure 10:
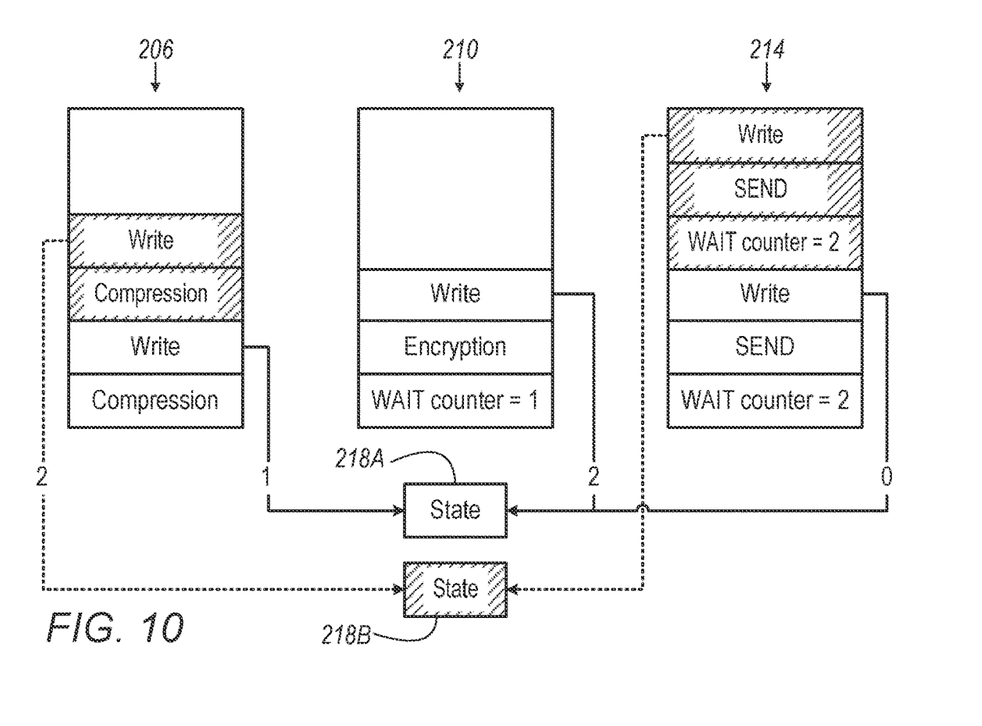

FIG. 10 is a diagram that schematically illustrates memory-based orchestration of queues, in accordance with another embodiment of the present invention. In the present example, a NIC applies compression, followed by encryption, followed by sending, to chunks of data. The NIC applies these operations to two data chunks in a pipelined manner, using three QPs. A first QP 206 manages compression operations, a second QP 210 manages encryption, and a third QP 214 manages sending to the network.

Blocks in the figure that correspond to the first data chunk are drawn with a clear pattern, and blocks that correspond to the second data chunk are drawn with a hashed pattern.

In the present example, a counter 218A is used for storing the state of processing of the first data chunk, and a counter 218B is used for storing the state of processing of the second data chunk. Counters 218A and 218B may reside, for example, in memory locations 56 of FIG. 1 or FIG. 4. For each of the counters, a counter value of "1" means that the data chunk has been compressed but not yet encrypted, and a counter value of "2" means that the data chunk has been compressed and encrypted, but not yet sent. A counter value of "0" means that the data chunk is either (i) sent already, or (ii) not compressed yet.

The counters are incremented by QPs 206, 210 and 214. Upon completing compression of a data chunk, QP 206 writes "1" to the corresponding counter. On Queue 210, a WAIT WQE causes a wait until the counter value is "1" before proceeding to encrypt the data chunk. Upon completing encryption of a data chunk, QP 210 writes "2" to the corresponding counter. On Queue 214, a WAIT WQE causes a wait until the counter value is "2" before proceeding to send the data chunk. Upon completing sending of a data chunk, QP 214 writes "0" to the corresponding counter. (In the specific example shown in the figure, the second data chunk is specified as unencrypted, and therefore does not go through the encryption stage of the pipeline.)

Thus, using the disclosed memory-based techniques, the queues and counters are used to implement a state machine that manages the above-described compression-encryption-sending pipeline.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device in a communication network, the network device comprising:
   a controller, configured to communicate with a group of one or more work-request initiators, wherein at least a work-request initiator among the work-request initiators is a remote work-request initiator so that communication with the remote work-request initiator is performed over the communication network, the controller configured to manage execution of an operation whose execution depends on inputs from the work-request initiators; and
   processing circuitry, configured to:
      read one or more values set by the work-request initiators, including a value set by the remote work-request initiator by communication over the communication network, in one or more memory locations that are accessible to the work-request initiators, including the remote work-request initiator, and to the network device; and
      trigger execution of the operation in response to verifying that the one or more values read from the one or more memory locations, including the value set by the remote work-request initiator, indicate that the work-request initiators in the group have provided the respective inputs.

2. The network device according to claim 1, wherein at least one of the one or more memory locations resides in the network device.

3. The network device according to claim 1, wherein at least one of the one or more memory locations resides in a compute node that hosts the network device.

4. The network device according to claim 1, wherein at least one of the one or more memory locations resides remotely from the network device, over the communication network.

5. The network device according to claim 1, wherein the processing circuitry is configured to verify that the one or more values read from the one or more memory locations indicate that all the work-request initiators in the group have consented to the execution of the operation.

6. The network device according to claim 5, wherein the one or more memory locations comprise multiple memory locations, each memory location set by a respective work-request initiator in the group, and wherein the processing circuitry is configured to evaluate a condition defined over the values read from the memory locations, and to trigger the execution of the operation in response to verifying that the condition is met.

7. The network device according to claim 6, wherein the processing circuitry is configured to evaluate the condition by calculating a minimum among the values read from the memory locations, and to trigger the execution of the operation in response to verifying that the minimum reaches a target value.

8. The network device according to claim 5, wherein the one or more memory locations comprise a single memory location that is shared among the work-request initiators in the group, and wherein the one or more values comprise a single counter value that is updated by the work-request initiators in the shared memory location.

9. The network device according to claim 1, wherein a size of the group is predefined.

10. The network device according to claim 1, wherein the controller is further configured to define a condition that depends on the one or more values stored in the one or more memory locations, and
   wherein the processing circuitry is configured to evaluate the condition over the one or more values read from the one or more memory locations, and to trigger the execution of the operation in response to verifying that the condition is met.

11. The network device according to claim 1, wherein two or more of the work-request initiators reside in a single compute node.

12. The network device according to claim 1, wherein at least two of the work-request initiators reside in different compute nodes.

13. The network device according to claim 1, wherein at least one of the work-request initiators resides in the network device.

14. The network device according to claim 1, wherein at least a given work-request initiator resides in a compute node that hosts the network device, and wherein the controller is configured to receive from the compute node a command for setting a memory location, and to atomically access the memory location in response to the command.

15. The network device according to claim 14, wherein the command comprises a Memory Mapped Input-Output (MMIO) access.

16. The network device according to claim 1, wherein the group of one or more work-request initiators comprises a plurality of work-request initiators.

17. A method for distributed computing in a network device in a communication network, the method comprising:
   communicating with a group of one or more work-request initiators, wherein at least a work-request initiator among the work-request initiators is a remote work-request initiator so that communication with the remote work-request initiators is performed over the communication network;
   for an operation whose execution depends on inputs from the work-request initiators, reading, by the network device, one or more values set by the work-request initiators, including a value set by the remote work-request initiator by communication over the communication network, in one or more memory locations that are accessible to the work-request initiators, including the remote work-request initiator, and to the network device; and
   triggering, by the network device, execution of the operation in response to verifying that the one or more values read from the one or more memory locations, including the value set by the remote work-request initiator, indicate that the work-request initiators in the group have provided the respective inputs.

18. The method according to claim 17, wherein at least one of the one or more memory locations resides in the network device.

19. The method according to claim 17, wherein at least one of the one or more memory locations resides in a compute node that hosts the network device.

20. The method according to claim 17, wherein at least one of the one or more memory locations resides remotely from the network device, over the communication network.

21. The method according to claim 17, wherein triggering the execution comprises verifying that the one or more values read from the one or more memory locations indicate that all the work-request initiators in the group have consented to the execution of the operation.

22. The method according to claim 17, wherein the one or more memory locations comprise multiple memory locations, each memory location set by a respective work-request initiator in the group, and wherein triggering the execution comprises evaluating a condition defined over the values read from the memory locations, and triggering the execution of the operation in response to verifying that the condition is met.

23. The method according to claim 22, wherein evaluating the condition comprises calculating a minimum among the values read from the memory locations, and triggering the execution of the operation in response to verifying that the minimum reaches a target value.

24. The method according to claim 17, wherein the one or more memory locations comprise a single memory location that is shared among the work-request initiators in the group, and wherein the one or more values comprise a single counter value that is updated by the work-request initiators in the shared memory location.

25. The method according to claim 17, wherein a size of the group is predefined.

26. The method according to claim 17, wherein triggering the execution comprises:
defining a condition that depends on the one or more values stored in the one or more memory locations;
evaluating the condition over the one or more values read from the one or more memory locations; and
triggering the execution of the operation in response to verifying that the condition is met.

27. The method according to claim 17, wherein two or more of the work-request initiators reside in a single compute node.

28. The method according to claim 17, wherein at least two of the work-request initiators reside in different compute nodes.

29. The method according to claim 17, wherein at least one of the work-request initiators resides in the network device.

30. The method according to claim 17, wherein at least a given work-request initiator resides in a compute node that hosts the network device, and comprising receiving from the compute node a command for setting a memory location, and atomically accessing the memory location in response to the write command.

31. The method according to claim 30, wherein the command comprises a Memory Mapped Input-Output (MMIO) access.

32. The method according to claim 17, wherein the group of one or more work-request initiators comprises a plurality of work-request initiators.

* * * * *